Jan. 24, 1933. D. L. STAGE 1,895,140
AIRPLANE
Filed April 26, 1930
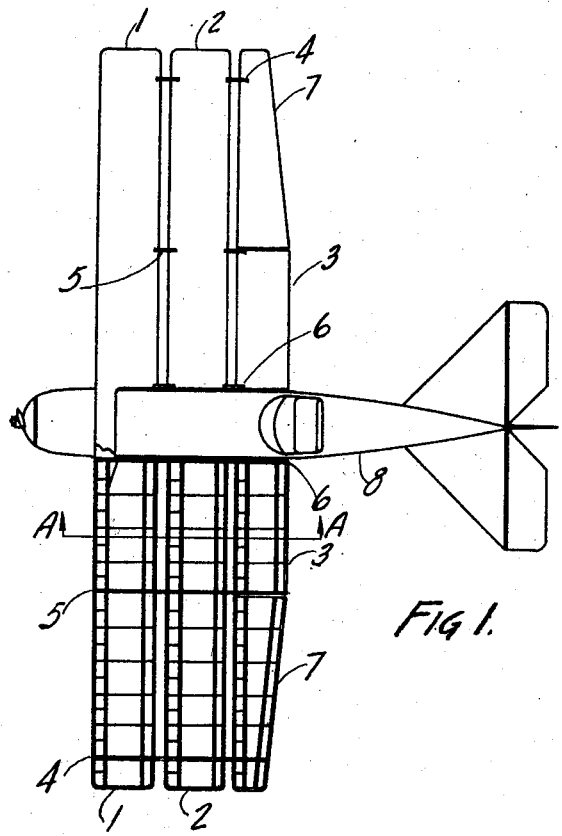
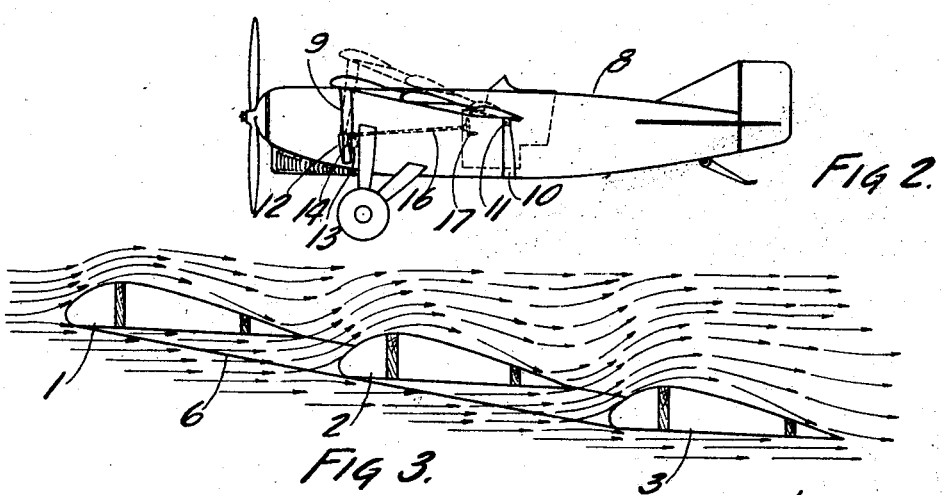
INVENTOR.
DARRELL LEWIS STAGE Patented Jan. 24, 1933

1,895,140

UNITED STATES PATENT OFFICE

DARRELL LEWIS STAGE, OF PALO ALTO, CALIFORNIA

AIRPLANE

Application filed April 26, 1930. Serial No. 447,569.

This invention relates particularly to airplane wings but is applicable to all aircraft that employ airfoils to obtain dynamic lift and consists of a combination of two or more airfoils of suitable camber and high aspect ratio, so disposed and fixed in relation, one to the other, as to form a combination aircraft wing of low aspect ratio.

The objects of my invention are first, to obtain an efficient wing of low aspect ratio, to reduce the wing span of airplanes; second, to obtain a wing structure of great strength and light weight; third, to increase stability of the airplane due to the operating characteristics of the combination wing as hereinafter set forth.

One form of my invention is illustrated in the accompanying drawing, in which—

Fig. 1 is a plan view of an airplane with the covering of the left hand combination wing removed, the wings being the subject-matter of my invention.

Fig. 2 is a side elevation of the airplane shown in Fig. 1, and shows position of the wings fixed to the fuselage.

Fig. 3 is a cross section, on line A—A of the wing of Fig. 1, and shows the air currents indicated by arrows, flowing about the wings diagrammatically.

The right hand combination wing, shown complete in Fig. 1, is built up of three airfoils of suitable camber, 1 is the leading airfoil, 2 is the following airfoil, and 3 is the trailing airfoil. The three airfoils 1, 2 and 3 are firmly fastened together and held in position by means of the cross spars 4, 5 and 6. The aileron 7, a separate airfoil, is hinged to cross spars 4 and 5 and is controlled by cables or other suitable means, known to the art.

The wings are fastened to the fuselage 8 and braced with struts 9 and 10, as shown in Fig. 2.

The air flowing around the leading airfoil 1, is level in flight, as shown in Fig. 3, results in a positive lifting force on the top side of the airfoil 1, due to the area of reduced air pressure along the top side of the airfoil 1. The lower side or sub-face of airfoil 1 is exerting a positive lift due to the angle of incidence. The following airfoil 2 is positioned to the rear and on a lower horizontal plane than airfoil 1, permitting a substantial volume of air to flow between airfoils 1 and 2 which passes over the top of airfoil 2 and results in the same characteristic suction lifting force that is obtained with the leading airfoil 1. The positive lifting forces on the lower side of airfoil 2 also of airfoil 3, are substantially the same as described for the leading airfoil 1. The airfoil 3, together with the aileron 7, is positioned to the rear and on a lower horizontal plane than airfoil 2 and functions substantially the same as airfoil 2. The air stream that has passed over the top of airfoil 1 is swept up and away from airfoil 2 by the air stream flowing between airfoils 1 and 2. A similar condition exists between airfoils 2 and 3 and for succeeding airfoils, when used.

The combined airfoils 3 and aileron 7, also airfoils 1 and 2, considered individually, are airfoils of high aspect ratio, with the characteristic small end losses of the high aspect ratio airfoil. With these three airfoils fastened together to function as one wing, the end losses of the three airfoils are proportional to their individual widths and it is evident that the total end losses of the combination wing are much smaller than the end losses of a single airfoil of low aspect ratio having a length and area equal to the combination wing. Therefore my wing is of the compact, sturdy form of the low aspect ratio wing with an efficiency comparable to the high aspect ratio wing.

In flight the center of pressure of an airfoil changes over a considerable range between leading and trailing edge, with the changing angle of incidence, whereas the center of pressure of the wing 1 herein illustrate and describe, the resultant of the centers of pressure of the several airfoils employed to form the wing, and the center of pressure movement of the combination wing is substantially the same as the average center of pressure movements of the several airfoils used to form the wing. This comparatively small center of pressure movement results in great stability of the airplane and permits a strong, light weight wing structure, due to the more even distribution of stresses in the wing structure when the airplane is in flight.

At high angles of incidence the leading airfoil 1 functions in the same manner as any single airfoil when approaching the stalling angle, that is, the usual breaking away of the airstream occurs on the top side of airfoil 1, resulting in a very low lift to drag ratio, while the airfoil 2 is still operating with a good lift to drag ratio due to the air stream deflected from the lower sub-face of airfoil 1 and tending to flow over the top of airfoil 2 in the usual manner. The airfoil 3 functions the same as airfoil 2 under similar conditions. This increased lift to drag ratio at high angles of incidence gives better stability and control and widens the range of the stalling angle.

It is the object of engineers to develop an airplane wing that can be made to give high lifting powers when taking off and landing, and can be cut down to low lifting power when it is operating at cruising or top speeds. The reason for wanting to cut down the high lifting power at high speeds is that it is not necessary and only offers increased drag. In other words, the average conventional wing gives the necessary amount of lift on landing and taking off, but at cruising and top speeds is giving an overabundance of lift which serves no useful purpose and actually cuts down the possible speed.

The simplest and least expensive method of achieving this object of variable lift in flight is by a wing with a variable angle of incidence. Thus, for taking off and landing, or changing altitude at any time, a high angle of incidence would be used and for cruising and top speeds it would be cut down to the minimum necessary to continue at a constant height.

This cannot be done with the conventional wing because the center of pressure varies extensively with the changes of angles of incidence. This would cause serious instability and serious danger.

This can be achieved with the compound wing because the center of pressure varies so slightly that it would not seriously affect the stability of the plane.

In order to accomplish the varying of the angle of incidence of the wings herein described, an adjusting mechanism is provided to hold the wings at any desired angle. The trailing edge of each airfoil 3, is pivotally supported adjacent the fuselage 8, as at 11. The airfoil 1 is secured to the top of a rack 12, which latter is slidably held on the fuselage 8. A gear 13 is in mesh with the rack 12 to raise or lower the said rack, thereby to move the entire wing as a unit around the fulcrum 11, thereby varying the angle of incidence of the wing. The gear 13 is mounted on the fuselage 8 and is suitably controlled by a worm 14, which latter in turn is rotatable by a control rod 16 having a hand wheel 17 attached to the free end thereof. The hand wheel 17 is disposed in a convenient position relatively to the pilot's seat. Therefore the angle of incidence of the wing can be readily varied by turning the hand wheel.

Having thus described this invention, what I claim and desire to secure by Letters Patent is:

1. The combination of a plurality of airfoils of high aspect ratio, positioned in parallel planes and being spaced apart rearwardly and downwardly in succession relative to the leading airfoil, fastened together with cross spars to form a wing of low aspect ratio, and with the outer section of the trailing airfoil pivotally mounted between the two outer cross spars to form an aileron.

2. A wing for airplanes comprising a frame on the fuselage, a plurality of parallel airfoils arranged on the frame in successive rearwardly and downwardly spaced relation from the leading airfoil, the trailing edge of each airfoil being above the level of the leading edge of the next succeeding airfoil, but below the level of the peak of the upper camber of the latter, to direct a flow of air to the said upper camber.

In testimony whereof, I have hereunto set my hand at Palo Alto, California, this 31st day of March 1930.

DARRELL LEWIS STAGE,